United States Patent
Tortora et al.

(10) Patent No.: US 11,762,336 B2
(45) Date of Patent: *Sep. 19, 2023

(54) SYSTEM AND METHOD FOR DETERMINING AT LEAST ONE PARAMETER RELATING TO AN ANGULAR MOVEMENT OF AN ARBOR

(71) Applicant: The Swatch Group Research and Development Ltd, Marin (CH)

(72) Inventors: Pierpasquale Tortora, Neuchâtel (CH); Vittorio Zanesco, Neuchâtel (CH)

(73) Assignee: The Swatch Group Research and Development Ltd, Marin (CH)

( * ) Notice: Subject to any disclaimer, the term of this patent is extended or adjusted under 35 U.S.C. 154(b) by 981 days.

This patent is subject to a terminal disclaimer.

(21) Appl. No.: 16/681,148

(22) Filed: Nov. 12, 2019

(65) Prior Publication Data
US 2020/0201256 A1 Jun. 25, 2020

(30) Foreign Application Priority Data

Dec. 21, 2018 (EP) ..................................... 18215436

(51) Int. Cl.
G04B 9/00 (2006.01)
(52) U.S. Cl.
CPC .................................... G04B 9/005 (2013.01)
(58) Field of Classification Search
CPC ....................................................... G04B 9/005
See application file for complete search history.

(56) References Cited

U.S. PATENT DOCUMENTS 5,748,111 A 5/1998 Bates
9,244,438 B2 * 1/2016 Hoover .................. G04B 27/02
(Continued)

FOREIGN PATENT DOCUMENTS

CN 205403811 U 7/2016
CN 107014317 A 8/2017
(Continued)

OTHER PUBLICATIONS

Notice of the Reason for Refusal dated Jan. 12, 2021 from the Japanese Patent Office in JP Application No. 2019-220113.
European Search Report for EP 18215436 dated May 14, 2019.

*Primary Examiner* — Renee S Luebke
*Assistant Examiner* — Matthew Hwang
(74) *Attorney, Agent, or Firm* — Sughrue Mion, PLLC

(57) ABSTRACT

A system and method to determine angular movement of an arbor integral with a crown of a watch, the arbor being rotatable on itself in a longitudinal direction. The system includes a rotating reflector mounted on the arbor, and two emitter/detector pairs disposed on either side of the reflector, each including a light source for illuminating the reflector, and a light detector for receiving the light reflected on the reflector and for generating an electrical signal representative of the reflected light. A processor processes the electrical signals, and determines a parameter relating to the angular movement of the arbor. The rotating reflector is a cylinder of revolution and light absorption points are made on the circumference of an external cylindrical surface. When the reflector rotates in a regular manner and in the same direction of rotation, the representative electrical signal generated by each detector has a sinusoidal shape.

16 Claims, 3 Drawing Sheets

(56) References Cited

U.S. PATENT DOCUMENTS

| | | | |
|---|---|---|---|
| 9,797,753 B1 | 10/2017 | Gowreesunker et al. | |
| 10,302,465 B2 * | 5/2019 | Gowreesunker | G01D 5/3473 |
| 11,029,648 B2 * | 6/2021 | Tortora | G04C 3/001 |
| 2002/0125412 A1 * | 9/2002 | Barnett | G01D 5/36 |
| | | | 250/225 |
| 2006/0097051 A1 * | 5/2006 | Foo | G01D 5/34715 |
| | | | 235/454 |
| 2014/0293755 A1 * | 10/2014 | Geiser | G04G 11/00 |
| | | | 368/10 |
| 2016/0069713 A1 | 3/2016 | Ruh et al. | |
| 2018/0010930 A1 * | 1/2018 | Isikman | G01D 5/285 |
| 2018/0010931 A1 * | 1/2018 | Savage | G01D 5/347 |
| 2018/0157218 A1 | 6/2018 | Zanesco et al. | |

FOREIGN PATENT DOCUMENTS

| | | |
|---|---|---|
| EP | 2 884 239 A1 | 6/2015 |
| EP | 3 015 925 A1 | 5/2016 |
| JP | 7-159199 A | 6/1995 |
| JP | 2005-17011 A | 1/2005 |
| JP | 2011-174800 A | 9/2011 |
| JP | 2016-526714 A | 9/2016 |
| JP | 2018-91835 A | 6/2018 |
| WO | 2014/200766 A1 | 12/2014 |
| WO | 2015122885 A1 | 8/2015 |
| WO | 2015147756 A1 | 10/2015 |

\* cited by examiner

SYSTEM AND METHOD FOR DETERMINING AT LEAST ONE PARAMETER RELATING TO AN ANGULAR MOVEMENT OF AN ARBOR

CROSS-REFERENCE TO RELATED APPLICATIONS

This application claims priority to European Patent Application No. 18215436.9, filed on Dec. 21, 2018, the entire contents of which are incorporated herein by reference.

FIELD OF THE INVENTION

The invention concerns a system and a method for determining at least one parameter relating to an angular movement of an arbor able to rotate on itself. Such a parameter is, for example, the angular position, or speed of rotation, or direction of rotation of the arbor.

The invention also concerns a timepiece comprising the determination system. The timepiece is, for example, a quartz watch, the arbor then being the stem integral with a time-setting crown.

STATE OF THE ART

It is known to provide a watch, for example a quartz watch, with an electronic crown by means of which a user can set the time and thus the position of the hands, without contact with the gear train of the watch. To do so, an electronic or optical or electro-optical device is arranged inside the watch, which makes it possible to determine one or more parameters relating to the angular movement of the arbor integral with the crown, and thus to position the hands in the position desired by the user. More specifically, the rotational action of the crown made by the user is converted by the device into an electronic pulse to a watch processor, in order to communicate thereto how many steps and in which direction the hands must be turned. This type of coding may, for example, be achieved via a galvanic contact, a magnetic coil using the Hall effect, a capacitive device, or an electro-optical device implementing light signal transmission and detection.

Such an electro-optical device, in particular for determining the angular position and/or direction of rotation of the arbor integral with a watch crown, is, for example, disclosed in European Patent document No. EP 3 015 925 A1. The stem integral with the crown has a reflection surface on its external periphery. The device has a light source intended to illuminate the reflection surface, and a light detector intended to receive a reflected light beam from the reflection surface and to generate an electrical signal representative of the beam. The device further includes a processor configured to form, from the electrical signals received from the detector, at least two pixel patterns at two different instants. The processor is also configured to compare the successive pixel patterns, and to deduce therefrom at least one parameter relating to the angular movement of the stem if a shift occurs between the pixel patterns.

However, one drawback of the electro-optical device proposed in EP 3 015 925 A1 is that it generates relatively long processing times for the processor, due to the amount of data acquired. This solution thus requires providing sufficient power for the processor, which affects both the overall size of the latter and the power consumption of the device. Given that the space and energy available are particularly restricted in a watch, this may prove problematic for the overall dimensions of the system and its autonomy.

U.S. Pat. No. 9,797,753 B1 discloses an optical encoder for setting watch functions. The encoder includes a rotating shaft with a patterned surface, a light source for illuminating the patterned surface, an array of optical sensors for receiving a portion of a reflection of light on the patterned surface and a processor for processing the information from the optical sensors. A single light source is provided, which means that it is not possible to precisely and simply determine every angular movement of the rotating shaft.

SUMMARY OF THE INVENTION

It is thus an object of the invention to provide an electro-optical system for determining at least one parameter relating to an angular movement of an arbor able to rotate on itself, which makes it possible to operate with a limited amount of acquired data in order to reduce the processing power required, while ensuring precise and rapid determination of the parameter(s).

To this end the invention concerns a system for determining at least one parameter relating to an angular movement of an arbor, particularly an arbor integral with a timepiece crown, which includes the features mentioned in the independent claim 1.

Specific embodiments of the system are defined in the dependent claims 2 to 9.

Due to the pattern of absorption points made on the cylindrical surface of the rotating reflector, the light detectors of the system of the invention each generate a representative electrical signal, which has a substantially sinusoidal shape, when the reflector rotates on itself in a same direction of rotation. More precisely, the arrangement of light absorption points on the outer surface of the reflector, seen from each emitter/detector pair, changes when the reflector rotates on itself in a regular manner and such that the representative electrical signal generated by each detector has a substantially sinusoidal shape. Due to the substantially sinusoidal shape of the signals generated by the detectors, the processing performed by the system processor, to determine the parameter(s) relating to the angular movement of the arbor, is reduced. This makes it possible to determine the parameter(s) in a precise, reliable manner and with a limited amount of acquired data allowing a fast processing time, compactness and minimal energy consumption of the processor.

Advantageously, the two emitter/detector pairs are arranged with respect to the rotating reflector such that the two emitters, respectively the two detectors, are arranged head-to-tail with respect to the other. This makes it possible to introduce a phase shift between the signals generated by the two light detectors when the reflector rotates on itself. Such a phase shift makes it possible for the computer program implemented in the system memory means to determine the direction or speed of rotation of the arbor. Further, owing to this spatial arrangement of the two emitter/detector pairs, none of the light detectors misses the reflected light beam from the reflector.

Advantageously, the two emitter/detector pairs are arranged on either side of the rotating reflector, on a circle whose centre is substantially the centre of the rotating reflector, and are offset from each other by an angle having a value other than 180°. This feature makes it possible to introduce a phase shift and/or to enhance the existing phase shift between the signals generated by the two light detectors when the reflector rotates on itself. Indeed, the two emitter/ detector pairs do not see the reflector at the same angle, which introduces a phase shift between the generated signals. Preferably, the total phase shift created between the two signals is at least 25°, more preferably still substantially equal to 90°.

According to a particular technical feature of the invention, the rotating reflector is formed from a cylinder of revolution. The absorption point arrangement can be made by means of laser etching, or by the deposition of black points (ink) from a digital printer.

To this end, the invention also concerns a timepiece comprising the determination system described above, and which includes the features mentioned in the independent claim 10.

A particular embodiment of the timepiece is defined in the dependent claim 11.

To this end, the invention also concerns a method for determining at least one parameter relating to an angular movement of an arbor, particularly an arbor integral with a timepiece crown, by means of the determination system described above, and which includes the features mentioned in the independent claim 12.

Particular embodiments of the method are defined in the dependent claims 13 to 15.

Advantageously, the method further includes a step, implemented by the processor, consisting in representing the two received electrical signals as the sine and cosine of a same function and calculating an arctangent function whose variable is the ratio between the two signals. This makes it possible to determine the angular position of the arbor at any time and in an unequivocal manner.

Advantageously, the method further includes a step, implemented by the processor, consisting in determining, according to the sign of the slope of the calculated arctangent function, the direction of rotation of the arbor.

Advantageously, the method further includes a step, implemented by the processor, consisting in alternately controlling the illumination of each of the light sources. This prevents the detector of one of the emitter/detector pairs being affected by the light from the emitter of the other emitter/detector pair.

To this end the invention also concerns a computer program including program instructions stored in memory means of the determination system described above and which, when executed by the system processor, are capable of implementing the determination method as described above, and which includes the features mentioned in the independent claim 16.

BRIEF DESCRIPTION OF THE DRAWINGS

The objects, advantages and features of the determination system and method according to the invention, and of the timepiece containing the system, will appear more clearly in the following description, based on at least one non-limiting embodiment illustrated by the drawings, in which.

DETAILED DESCRIPTION OF THE INVENTION

Figure 1:
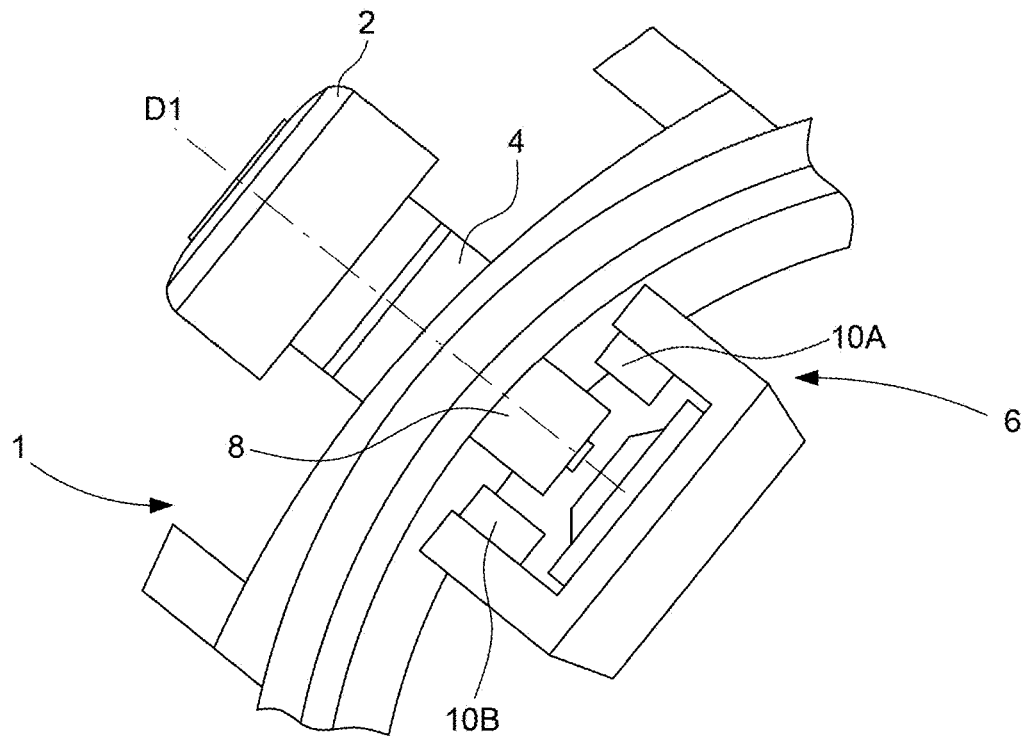
FIG. 1 is a perspective view of a watch provided with a time-setting crown, and a system for determining at least one parameter relating to an angular movement of the arbor integral with the crown, according to the invention.

FIG. 1 represents a part of a watch 1 provided with a time-setting crown 2. Crown 2 is joined to an arbor 4 which extends partly inside watch 1, particularly inside the watch case. Watch 1, which is, for example, a quartz watch, further comprises a system 6 for determining at least one parameter relating to an angular movement of arbor 4 integral with crown 2.

Arbor 4 is able to rotate on itself around a longitudinal direction D1. More precisely, when crown 2 is rotated by a user to set the time, arbor 4 is driven in rotation on itself around direction D1. It is to be noted that, optionally, crown 2 can be configured to be pulled out and/or pushed in by a user, driving arbor 4 in longitudinal translation. When arbor 4 is fitted to a watch 1, as is the case in the illustrative example of FIGS. 1 to 4, the diameter of arbor 4 is typically comprised in a range from 0.5 to 2 mm.

Figure 2:
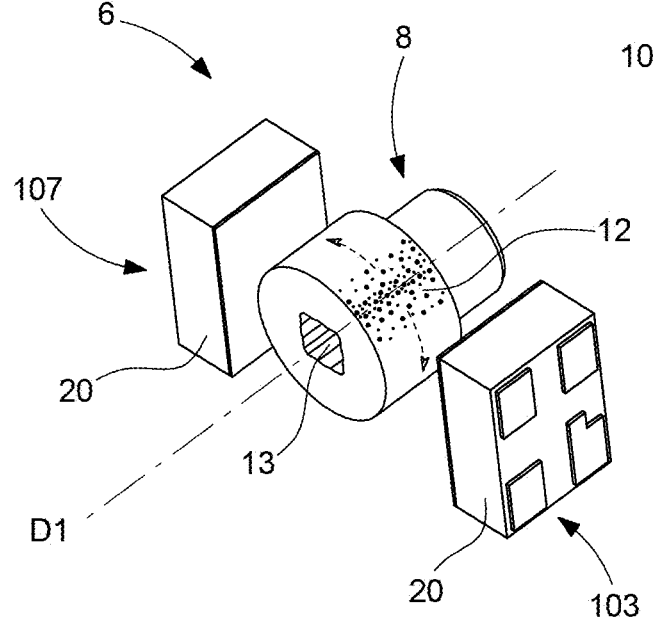
FIG. 2 is a perspective view of the system of FIG. 1, the system comprising a rotating reflector and two emitter/detector pairs.
Figure 3:
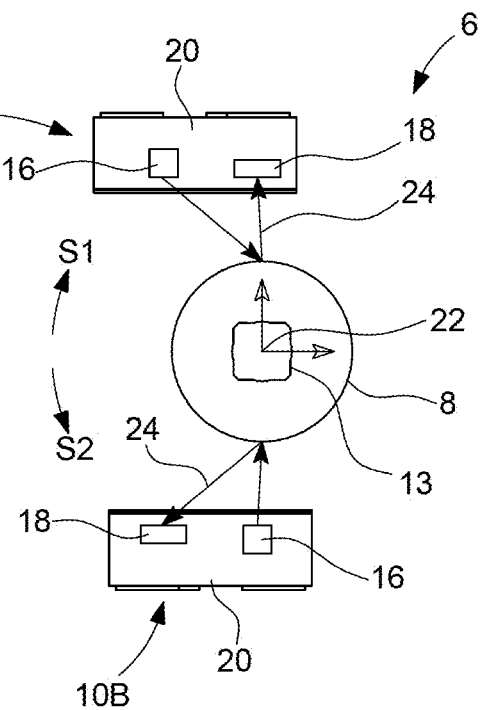
FIG. 3 is a front elevation view of the system of FIG. 2.

As illustrated in FIGS. 2 and 3, in addition to arbor 4, system 6 includes a rotating reflector 8 and two light emitter/detector pairs 10A, 10B. System 6 also includes a processor and memory means but these elements are not represented in the Figures for reasons of clarity.

Rotating reflector 8 is mounted on arbor 4, around the latter. Rotating reflector 8 is thus integral with arbor 4. Rotating reflector 8 is, for example, mounted on an end portion of arbor 4, although this particular arrangement of reflector 8 on arbor 4 is not limiting in the context of the present invention. Reflector 8 and arbor 4 may also be made in one piece (not represented).

Figure 4:
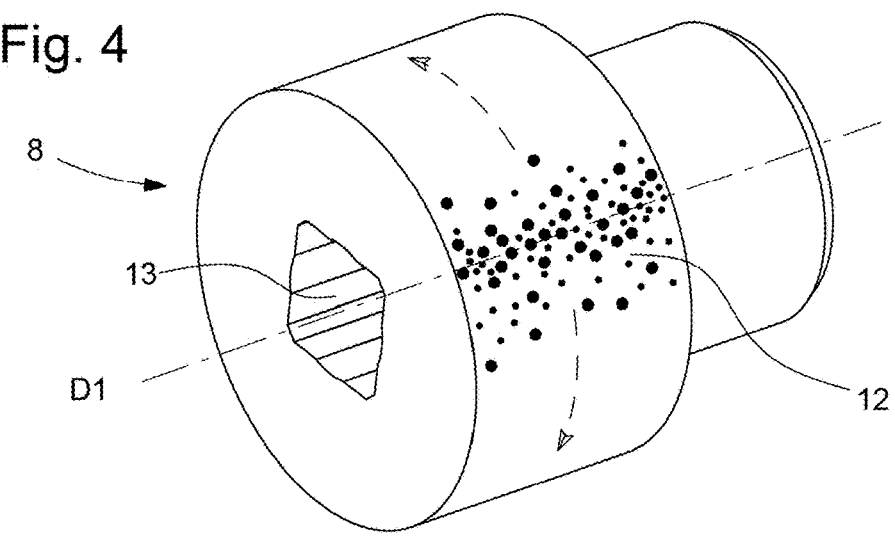
FIG. 4 is a perspective view of the rotating reflector of FIG. 2.

As shown in FIGS. 2 to 4, rotating reflector 8 is preferably formed from a cylinder of revolution. Peripheral surface 12 of reflector 8 is initially completely polished to have constant light reflectivity, like a mirror. This constant reflectivity is provided only by the material properties and surface quality. This cylindrical reflector 8 can, for example, have a diameter of 1.3 mm and a length of 0.77 mm. These dimensions are given merely for illustration without restriction for other values.

Rotating reflector 8 is, for example, metallic. The metal of reflector 8 is preferably chosen such that polished surface 12 reflects well in the wavelengths of light emitted by the light emitters. For example, for infrared light emitters, the metal chosen for reflector 8 may be a gold deposition. The choice of metal for reflector 8 is thus conditioned by the type of light emitters selected and can be adjusted according to the constraints of the product.

Figure 5:
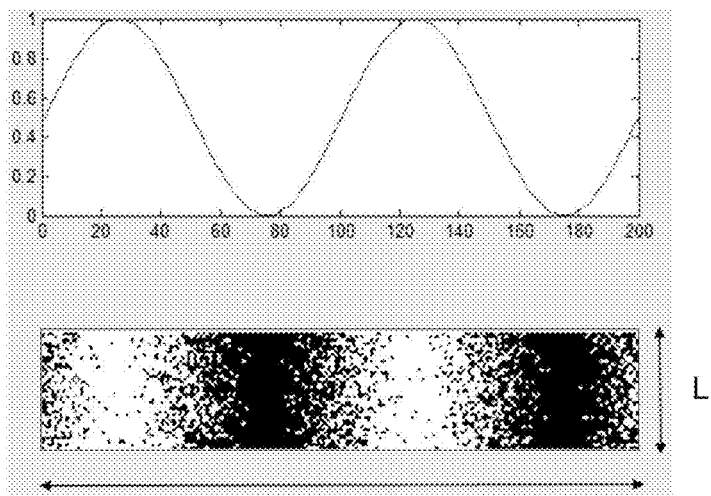
FIG. 5 represents a calculation of a matrix of black/white pixels to be etched or printed on the reflector wall in order to modulate the reflectivity of the surface thereof in a sine function.

In a subsequent operation, an absorption point arrangement is arranged to be etched or deposited, notably by printing, for example, over the entire circumference of polished surface 12 of the cylinder of revolution. For purposes of simplification, this point arrangement is not completely shown in FIGS. 1 to 4, but is represented in FIG. 5, as explained below. Prior to making this light absorption point arrangement on the polished surface, a pattern of absorption points (black points) must be produced. This is obtained in the form of a 2D computer image for example, and more precisely a matrix of black/white pixels.

FIG. 5 represents a frequency sine function 2 to which an offset of 1 can be added so that the value is always positive. This sine function oscillates between 1 and 0. Frequency 2 means that over a complete revolution of reflector 8, there is detection of two complete sine waves of light beams reflected by the detectors, i.e. 180° for each sine wave period. The matrix of points to be made on the polished surface of the cylinder is shown in a 2D image in the sine function graph. This 2D image must be reproduced over the entire peripheral circumference P of the polished surface of the cylinder of revolution and over a cylinder length L.

It is made in columns. The points where the function is 1, the reflectivity of the mirror must be maximum. Thus, in this column, no absorption pixel (black) will be made. However, where the function is 0, the reflectivity of the mirror must be minimum. Thus, all the pixels of this column will be black.

In terms of pixels, and in the example shown in FIG. 5, a reflectivity 1 means that, for example, 39 pixels of the column are all white. A reflectivity 0 means that, for example, 39 pixels of the column are all black. The intermediate cases are treated as follows. If, at a certain point, the value of the function is 0.6, this means that 60% of the pixels must stay white (23 pixels) and 40% of them must be black (16 pixels). In the non-limiting example represented, the cylinder has a peripheral circumference P equal to 4 mm and a length L equal to 0.77 mm. The initial image is composed of a rectangle of 4 mm by 0.77 mm, thus 200 times 39 pixels. These pixels or points in such case are 20 µm by 20 µm.

The object of this arrangement of points on reflector 8 is to obtain a signal, particularly a sinusoidal signal, at the detection of light by each detector 18 of the emitter/detector pairs. To this end, reflector 8 rotates on itself in a regular manner, notably at almost constant speed and in the same direction of rotation, and on the basis of a variation in light reflectivity.

The image presented in FIG. 5 can be etched or printed on the polished surface of reflector 8 in the form of a cylinder of revolution. The absorption points can be etched, for example, by a laser beam. If each (black) absorption point has a size of 20 µm by 20 µm, the etching laser beam can be a 20 µm spot controlled from the computer by a control unit. This 2D image is uploaded into the laser control unit and then etched on the cylinder wall using a rotating stand synchronized with the laser emission.

It is to be noted that it is well known that it is possible to modify the optical properties of the surface of a material using the action of a laser beam. A laser can thus be used to locally etch absorption points on the reflector surface. The laser settings are kept constant during machining of the component so that each black point absorbs light with uniform efficiency. In such conditions, the variation in reflectivity is due only to the density of black points as represented in FIG. 5. Gradually, as the reflector rotates facing the light emitter, the density of the absorption points varies, and this produces a variation in the light reflected and sent to the corresponding detector. As indicated, this variation in reflected light generates a detection signal, which may be sinusoidal depending on the arrangement of absorption points made on the reflector which rotates on itself and in the same direction of rotation. It is also possible to envisage having an absorbent surface, for example using a PVD treatment, wherein the etching, for example by laser, exposes reflection points and not absorption points.

As shown in FIGS. 1 to 3 and partly explained above, each emitter/detector pair 10A, 10B includes one light source 16 and one light detector 18. Light source 16 is typically formed of one or more light emitting diodes, able, for example, to emit infrared light. Light source 16 and light detector 18 are arranged in a protective case 20 and are preferably optically isolated from each other, for example by means of a separating wall. Each emitter/detector pair 10A, 10B forms, for example, a proximity sensor unit device.

The two emitter/detector pairs 10A, 10B are disposed on either side of rotating reflector 8, facing reflector 8. In a preferred embodiment represented in FIG. 3, the two emitter/detector pairs 10A, 10B are arranged with respect to rotating reflector 8 such that the two emitters 16, respectively the two detectors 18, are arranged head-to-tail with respect to each other. Preferably, as illustrated in FIG. 3, the two emitter/detector pairs 10A, 10B are placed on a circle, whose centre is substantially the centre 22 of rotating reflector 8, and are offset from each other by an angle having a value other from 180°.

Also, preferably, as visible in FIG. 3, the two emitter/detector pairs 10A, 10B and rotating reflector 8 are arranged to define a substantially Y-shaped spatial arrangement. More precisely, rotating reflector 8 is disposed at the centre of the Y, a first emitter/detector pair 10A is disposed at the free end of a short arm of the Y, and the other emitter/detector pair 10B is disposed at the free end of the long arm of the Y. In other words, as seen in FIG. 3, the two emitter/detector pairs 10A, 10B are disposed on either side of rotating reflector 8 and are axially offset from each other.

Each light source 16 is intended to illuminate one part of reflector 8. Each light detector 18 is intended to receive a reflected light beam 24 from reflector 8 and to generate an electrical signal representative of beam 24. The representative electrical signal generated by each detector 18 has a substantially sinusoidal shape when reflector 8 rotates on itself in a same direction of rotation S1, S2. Such a signal 26A, 26B is, for example, visible in FIG. 6.

The processor is configured to process each of the electrical signals 26A 26B generated by detectors 18. The processor is also configured to determine, according to the processing result, at least one parameter relating to the angular movement of arbor 4, as will be explained in detail below. The parameter(s) determined are, for example, the angular position, speed of rotation, or the direction of rotation of arbor 4.

Figure 6:
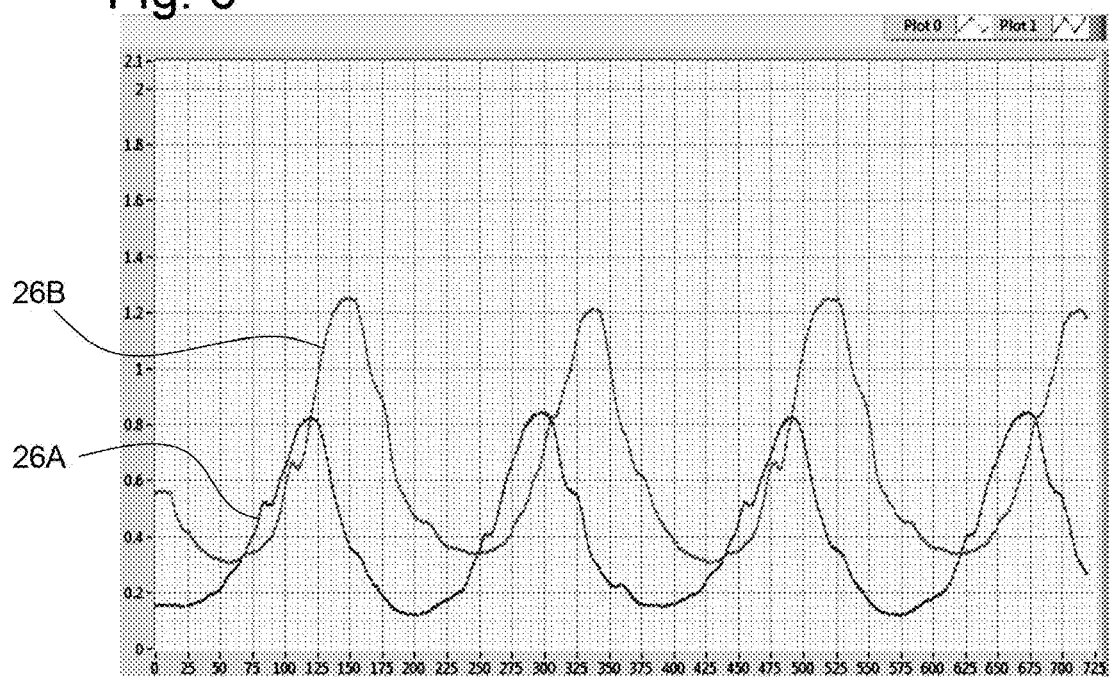
FIG. 6 is a diagram representing the evolution of two electrical signals generated by the detectors of the two emitter/detector pairs as a function of the angular position of the rotating reflector.

FIG. 6 represents two real signals 26A, 26B from detectors 18, at different angles corresponding to a rotation of rotating reflector 8 on itself. Each signal 26A, 26B is from a respective detector 18 of one of the emitter/detector pairs 10A, 10B. Each signal 26A, 26B has a substantially sinusoidal shape. Further, in the illustrative example of FIG. 6, signals 26A, 26B are phase shifted from each other by around 25°. Preferably, signals 26A, 26B are phase shifted by at least 25° and preferably substantially 90°.

Figure 7:
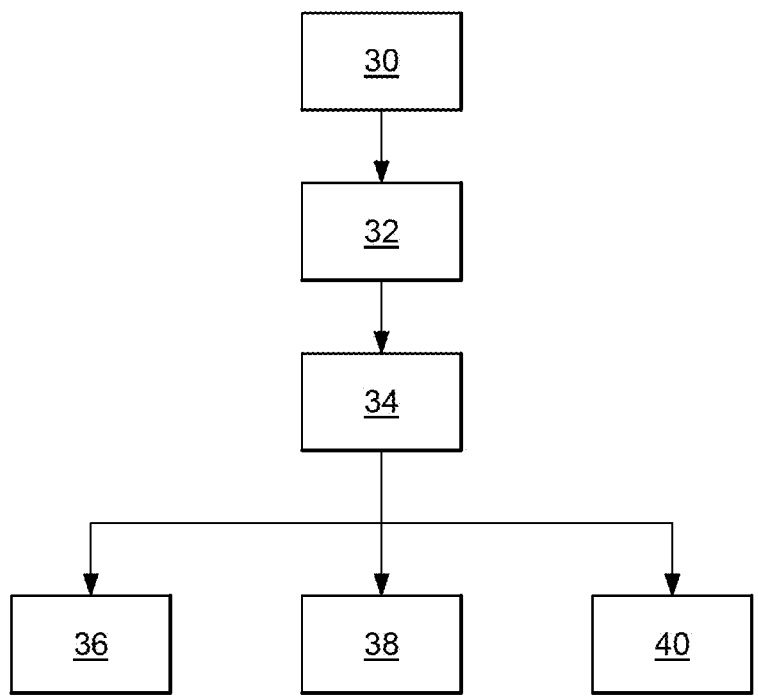
FIG. 7 is a flow chart representing steps of a method for determining at least one parameter relating to an angular movement of an arbor, implemented by the system of FIG. 1.

A method according to the invention for determining at least one parameter relating to an angular movement of arbor 4, implemented by the processor of system 6, will now be described with reference to FIGS. 7 and 8. It is assumed, initially, that a user manipulates arbor 4 to rotate it on itself around longitudinal direction D1, for example by manipulating crown 2 to set the time of a watch 1. This rotation of arbor 4 causes a rotation of rotating reflector 8 around longitudinal direction D1.

Preferably, the method includes an initial step 30 during which the processor alternately controls the illumination of each of light sources 16.

During an initial or subsequent step 32, the processor receives two electrical signals 26A, 26B from the two light detectors 18. Each of electrical signals 26A, 26B is representative of a reflected light beam 24 from reflector 8 and has a substantially sinusoidal shape.

During a next step 34, the processor determines the frequency of each of the two received sinusoidal signals 26A, 26B.

During a next step 36, the processor determines the speed of rotation of arbor 4, by comparison between the frequency determined during step 34 and a correspondence table pre-stored in the system memory means.

Preferably, the method includes a parallel or next step 38, during which the processor represents the two received electrical signals 26A, 26B as the sine and cosine of a same function, then calculates an arctangent function whose variable is the ratio between the two signals. The result of this calculation is represented in FIG. 8 for the particular example embodiment of signals 26A, 26B represented in FIG. 6. It is noted that, over a half period of revolution of rotating reflector 8 corresponding to 180°, the curve 39 obtained is a straight line. Thus, the processor, which has access to a given value of a calculated arctangent function, can deduce therefrom the angular position of arbor 4, in an unequivocal manner. Further, the sign of the slope of the straight line obtained is a function of the direction of rotation of arbor 4. Thus, the method can comprise a parallel or next step 40 during which the processor determines, as a function of the sign of the slope of the straight line obtained, the direction of rotation of arbor 4.

Figure 8:
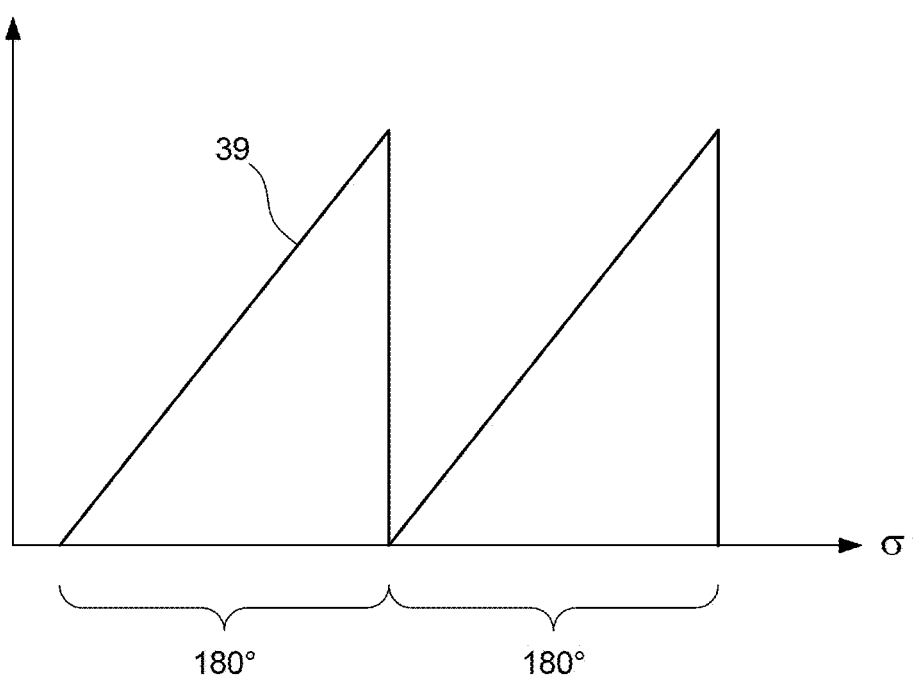
FIG. 8 is a diagram representing the evolution of an arctangent function calculated by a processor of the system of FIG. 2, as a function of the angular position of the rotating reflector.

It is to be noted that, to obtain the shape of curve 39 represented in FIG. 8, signals 26A, 26B must be phase shifted, preferably by at least 25°. Such a phase shift is obtained by the head-to-tail arrangement of emitter/detector pairs 10A, 10B, as described above, and/or by the non-symmetrical arrangement of the two emitter/detector pairs 10A, 10B on either side of rotating reflector 8, as described above. Thus, the resulting phase shift between signals 26A, 26B makes it possible to obtain the shape of curve 39 represented in FIG. 8, and consequently allows the processor to precisely determine the angular position and direction of rotation of arbor 4.

The memory means store a computer program product comprising program instructions, which, when executed by the processor of system 6, are capable of implementing the method as described above.

It is to be noted that the algorithm described above for generating the reflectivity image remains generally valid also when the pattern on the cylindrical reflector is made with techniques other than laser. For example, the black pixels could thus be made using a black ink ejected by a digital printer.

It is also to be noted that the same algorithm can be used to make other reflectivity images and to generate other signals in the detector such as a square wave or a ramp. However, it is more difficult to easily determine the speed of rotation of the arbor or stem integral with the crown.

The invention claimed is:

1. A system for a timepiece, the system comprising:
   an arbor configured to be able to rotate on itself around a longitudinal direction,
   a rotating reflector mounted on the arbor, around the arbor,
   a first emitter/detector pair disposed on a first side of the rotating reflector, the first emitter/detector pair comprising:
      a first light source configured to illuminate one part of the rotating reflector, and
      a first light detector configured to receive a first reflected light beam from the rotating reflector, that is reflected by the rotating reflector based on illumination by the first light source, and generate a first electrical signal representative of the first reflected light beam,
   a second emitter/detector pair disposed on a second side of the rotating reflector, the second emitter/detector pair comprising:
      a second light source configured to illuminate another part of the rotating reflector, and
      a second light detector configured to receive a second reflected light beam from the rotating reflector, that is reflected by the rotating reflector based on illumination by the second light source, and generate a second electrical signal representative of the second reflected light beam, and
   a processor configured to process each of the first electrical signal and the second electrical signal generated by the first light detector and the second light detector, and to determine, as a function of the processing result, at least one parameter relating to an angular movement of the arbor,
   wherein the rotating reflector is in the form of a cylinder of revolution, and
   an arrangement of light absorption points is made over the entire circumference of a reflective outer surface of the cylinder of revolution, the arrangement of the light absorption points on the reflective outer surface being such that, when the rotating reflector rotates on itself in a regular manner and in the same direction of rotation, the first electrical signal and the second electrical signal have a substantially sinusoidal shape, and
   the first emitter/detector pair and the second emitter/detector pair are arranged with respect to the rotating reflector such that the first emitter/detector pair and the second emitter/detector pair are arranged head-to-tail with respect to each other such that:
      the first light source is in a first direction from the first light detector, and
      the second light detector is in the first direction from the second light source.

2. The system according to claim 1, wherein the first emitter/detector pair and the second emitter/detector pair are arranged head-to-tail with respect to each other such that:
   the first light source and the second light detector are aligned with each other in a first plane that is perpendicular to an axial direction of the rotating reflector, and
   the second light source and the first light detector are aligned with each other in a second plane that is perpendicular to the axial direction of the rotating reflector.

3. The system according to claim 2, wherein a distance in the first direction from the first plane to a center of the rotating reflector in the first direction is smaller than a distance in the first direction from the second plane to the center of the rotating reflector in the first direction.

4. The system according to claim 1, wherein the first emitter/detector pair, the second emitter/detector pair, and rotating reflector are arranged to define a substantially Y-shaped spatial arrangement, the rotating reflector being disposed at a center of the Y, the first emitter/detector pair being disposed at the free end of a short arm of the Y, and the second emitter/detector pair being disposed at the free end of the long arm of the Y.

5. The system according to claim 1, wherein the first light source and the first light detector are optically isolated from each other, and the second light source and the second light detector are optically isolated from each other.

6. The system according to claim 1, wherein the rotating reflector is made of metal, and an outer surface of the rotating reflector is polished.

7. The system according to claim 1, wherein the arrangement of the light absorption points over the entire circumference of the reflective outer surface of the cylinder of revolution, is obtained by etching using a laser controlled on the basis of a determined image defining a matrix of points or pixels, wherein a density of the light absorption points varies in a sinusoidal manner.

8. The system according to claim 7, wherein the density of the light absorption points etched over the entire circumference of the reflective outer surface varies in two sine wave periods.

9. The system according to claim 1, wherein the arrangement of the light absorption points over the entire circumference of the reflective outer surface of the cylinder of revolution, is obtained by depositing points of black ink from a digital printer on the basis of a determined image defining a matrix of points or pixels, wherein a density of the light absorption points varies in a sinusoidal manner.

10. The system according to claim 9, wherein the density of the light absorption points printed over the entire circumference of the reflective outer surface varies in two sine wave periods.

11. A timepiece comprising the system of claim 1.

12. The timepiece according to claim 11, wherein the timepiece is a quartz watch comprising a timepiece crown, wherein a stem of the arbor is integral with the timepiece crown.

13. A method performed by the system according to claim 1, the method comprising:
    receiving, by the processor, the first electrical signal from the first light detector,
    receiving, by the processor, the second electrical signal from the second light detector,
    determining frequencies of the first electrical signal and the second electrical signal, and
    determining, by the processor, by comparison between the frequencies determined by the processor and a correspondence table pre-stored in memory of the system, a speed of rotation of the arbor.

14. The method according to claim 13, further comprising:
    representing, by the processor, the first electrical signal and the second electrical signal as the sine and cosine of a same function, and
    calculating an arctangent function whose variable is a ratio between the first electrical signal and the second electrical signal.

15. The method according to claim 14, further comprising determining, by the processor, according to a sign of a slope of the calculated arctangent function, a direction of rotation of the arbor.

16. The method according to claim 13, further comprising alternatively controlling each of the first light source and the second light source to illuminate.

\* \* \* \* \*